Patented Aug. 23, 1932

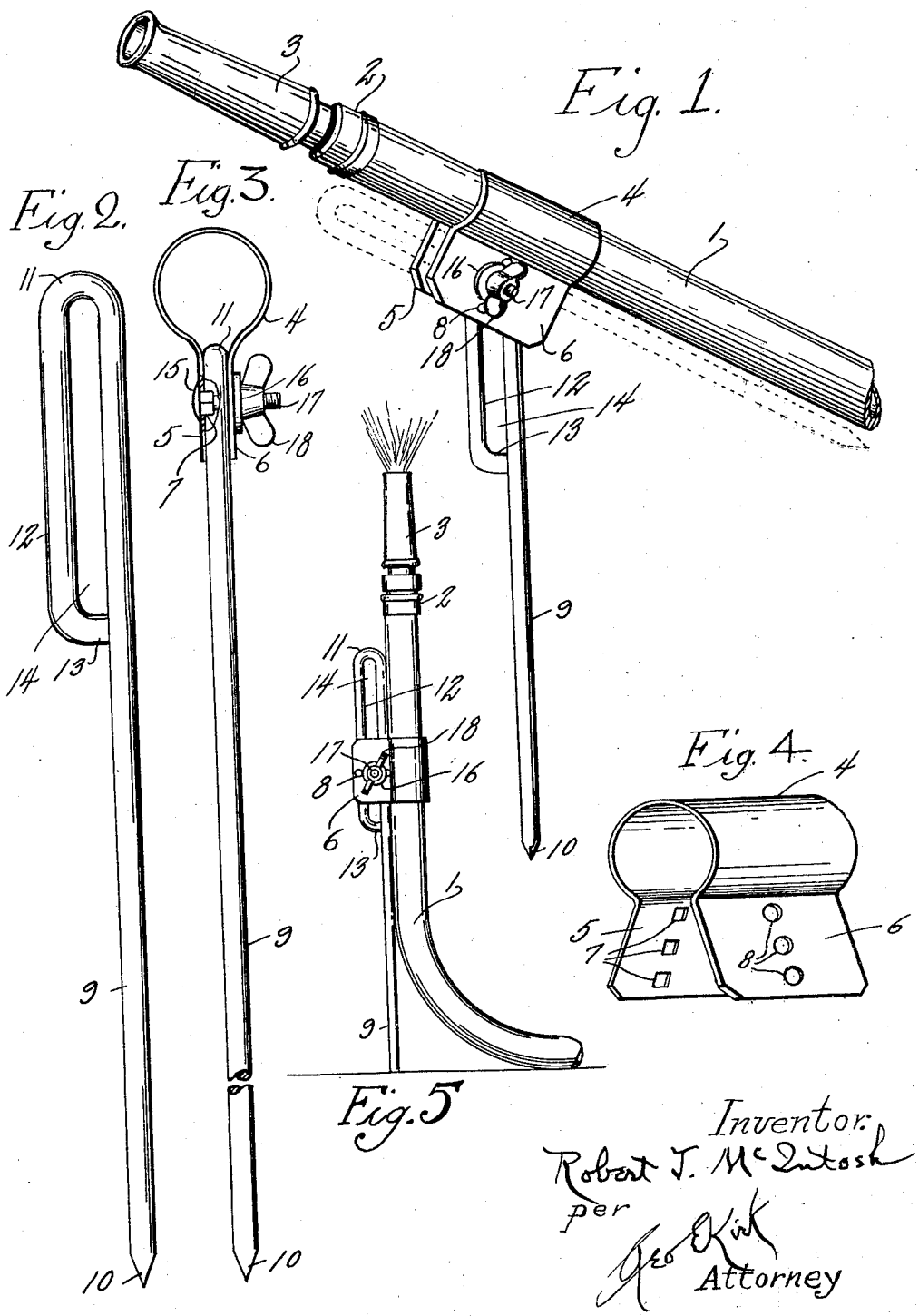

1,873,615

UNITED STATES PATENT OFFICE

ROBERT J. McINTOSH, OF TOLEDO, OHIO

NOZZLE DIRECTING DEVICE

Application filed August 12, 1930. Serial No. 474,749.

This invention relates to adjustable supports or directing means.

This invention has utility when incorporated in hose attachments, more especially for spray location as nozzle directing devices.

Referring to the drawing:

Fig. 1 is a view of an embodiment of the invention in assembled position with a hose and its nozzle as a directing device therefor;

Fig. 2 is a view of the leg or anchoring pin for the device of Fig. 1;

Fig. 3 is a view of the assembled device from a side thereof through which the hose, to be mounted, may extend;

Fig. 4 is a perspective view of the spring clamp in free or released position, and Fig. 5 is a view of the device in set-up position for a fountain or vertical spray.

Lawn or garden hose 1 is shown as a water supply duct having terminal fitting 2 for detachably mounting nozzle 3 adjustable for solid stream or spray.

In carrying out the invention hereunder, sheet metal one-piece clamp, of some flexibility and preferably with some spring reaction, is provided. This spring clamp or strap has medial U-portion 4 terminating in ears 5, 6. Series of square openings or holes 7 are provided through the ear 5 and circular openings 8 through the ear 6.

A rigid rod leg 9 is provided of circular cross-section and at its lower end or terminus having point 10 permitting ready piercing of the soil to sustain the leg in anchoring position for the hose nozzle. The leg 9, remote from the point 10, has upper return bend terminus 11 from which extends downward parallel portion 12 with rod end 13 bent back against the leg 9 to complete loop 14 as an elongated seat from the upper terminus of the leg 9.

For an assembly clamp and adjusting means hereunder, there is provided carriage bolt 15 having it square portion adjacent the bolt head act as a key in an opening 7 of the ear 5. This bolt then extends through the slot 14, through an opening 8 in the ear 6, through washer 16 to have threaded terminus 17 of the bolt 15 engaged by wingnut 18, operable to draw the ears 5, 6, toward each other into leg clamping position, and simultaneously adjust the strap or U-portion 4 into hose gripping and frictionally positioning the leg 9 in its direction of extent as to the hose 1. By providing a plurality of openings in the ear 6, such may be brought into registering position respectively with an opening in the ear 5 to have this hose grip or clamp adapt itself to hose of different diameters or sizes. The provision of the holes 7, 8, in pairs permits bringing of the holes into registry in pairs for the ears to approximate registry, in the size adjustments, and thus have the assembled device of more symmetry. Although even as shown, out-of-registry for the ears, with hole registry may give a nicety or range in clamping adjustment beyond that of the three dimensions provided by the three pair of holes 7, 8, primarily designed to take care of the three usual sizes for garden or lawn hose.

In setting up the device, the clamping bolt 15 may have its location in the loop 14 adjacent the return bend 11. Greater stiffness in the nozzle directing is attained by thrusting the bend 11 against the hose 1 at the inclination to the vertical leg 9, and then tightening the wing nut 18. The leg 9 is thus directly braced against the hose as well as held spaced from such end 11 by the frictional gripping action of the ears 5, 6, adjacent the bolt 15 along in the loop 14. With this circular cross-section leg 9, the hose portion away from the nozzle may be shifted and thus the device swung on the leg as a pivot to effect a change or obtain the desired nicety of location for the spray or watering stream. Furthermore, with the bolt 15 shifted down along the loop 14, and the wingnut then set up, the hose position is vertical and parallel to the leg 9 adjacent the clamp and the nozzle 3 is thus positively located vertically for a fountain spray.

In addition to these wide angles for nozzle directing from vertical to horizontal and the full circle of swing for each position away from vertical, there is utility in this device in its compactness for positive out-of-use convenient location. This is a feature contributing to its universal range of usefulness. By releasing the wingnut 18, the leg 9 may be brought into parallelism with the hose 1. With such shifting of the leg longitudinally as to bring the bolt 15 along the loop 14 adjacent the bent back rod end 13, there is a compact assembly, and tightening of the nut 18 so holds the leg 9. The point 10 is thus shielded by the hose and positively held against swinging outward. Accordingly, with the device left assembled where it may be desired to use it, the hose may be reeled or otherwise stored; it may be taken out and the nozzle used as though there were no spray directing attachment therewith. As it may be desired to avail of the device, no tools are necessary and there are no parts to hunt for or to be lost, but all is in readiness by the simple hand operation of the wing nut 18. Without changing the location of the device hereunder with the hose 1, a substitute nozzle or other attachment, or even hose extension may be assembled at the fitting 2. In putting out the device, such may be given a finish to withstand its in-use or weathering conditions, as an enamel finish or coating.

What is claimed and it is desired to secure by Letters Patent is:

A hose nozzle directing device comprising a U-shaped plate having a return bend portion in excess of semi-cylindrical extent with a pair of parallel sheet portions therefrom as the ends of the U-plate, there being spaced from the semi-cylindrical portion and through said parallel sheet portions a pair of registering holes, a bolt through said holes, and a leg pointed at one end and having an elongated loop at the other end, said loop being located between said sheets, said bolt being effective as a clamp through the holes and loop and adjustable to frictionally grip the loop between said sheets and thereby fix the leg point parallel to or at different angles from the hose with which said semi-cylindrical portion is adapted to be assembled by the said same bolts as fixed with the leg, said leg being thereby free to be inserted vertically in soil to direct the nozzle vertically or at such other or different angle as the leg may be held relatively to the general direction of the semi-cylindrical portion of the plate.

In witness whereof I affix my signature.

ROBERT J. McINTOSH.